United States Patent [19]

Zoller

[11] Patent Number: 4,868,021

[45] Date of Patent: Sep. 19, 1989

[54] MOLDED TRIM WITH BRIGHT INSERT

[75] Inventor: Robert A. Zoller, Bay Village, Ohio

[73] Assignee: The Standard Products Company, Cleveland, Ohio

[21] Appl. No.: 106,121

[22] Filed: Oct. 7, 1987

[51] Int. Cl.$^4$ .............................................. B60R 13/04
[52] U.S. Cl. ........................................ 428/31; 52/716; 293/128
[58] Field of Search ................ 428/31, 67, 542.8; 293/128; 52/716

[56] References Cited

U.S. PATENT DOCUMENTS

| | | | |
|---|---|---|---|
| 3,046,174 | 7/1962 | Brooks et al. ............... | 428/31 X |
| 3,881,042 | 4/1975 | Ungerer ...................... | 428/67 |
| 4,246,303 | 1/1981 | Townsend ................... | 428/31 |
| 4,260,655 | 4/1981 | Zoller ......................... | 428/31 |
| 4,351,864 | 9/1982 | Giannakidis ................ | 428/31 |
| 4,403,004 | 9/1983 | Parker et al. ................ | 428/31 |
| 4,446,179 | 5/1984 | Waugh ........................ | 428/31 |
| 4,563,141 | 1/1986 | Zoller ......................... | 428/31 X |
| 4,566,929 | 1/1986 | Waugh ........................ | 428/31 X |
| 4,619,847 | 10/1986 | Jackson ...................... | 428/31 |

*Primary Examiner*—Henry F. Epstein
*Attorney, Agent, or Firm*—Harness, Dickey & Pierce

[57] ABSTRACT

A method for making a trim molding for attachment to a vehicle includes the steps of forming a film with a predetermined radius of curvature and securing the film to the surface of a mold. The steps include injecting a polymeric material into the mold and forming a base member having an arcuate portion adjacent the arcuate portion of the film and bonding the film to the base member.

7 Claims, 1 Drawing Sheet

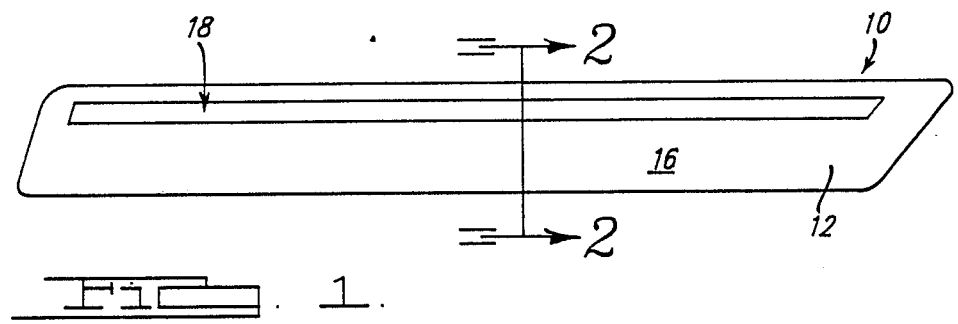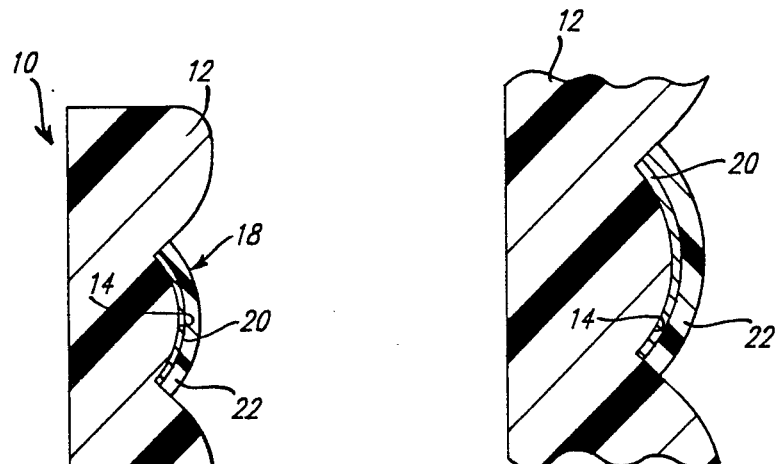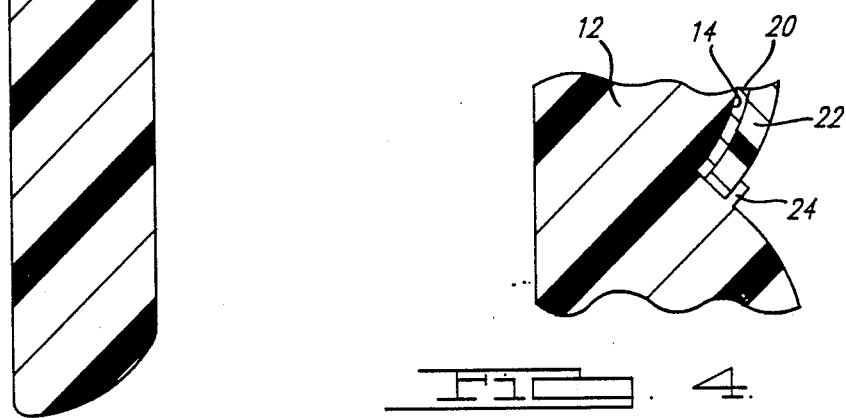

MOLDED TRIM WITH BRIGHT INSERT

TECHNICAL FIELD

The subject invention relates to a molded trim for attachment to a vehicle.

BACKGROUND AND SUMMARY OF THE INVENTION

Molded trim strips have been used in the past. One method of fabricating a molded trim with a bright insert or extrusion comprises the steps of molding a bumper or nerf strip and subsequently attaching a bright extrusion to the molded strip. This results in a very costly and time consuming method.

Accordingly, the subject invention is a method for making a trim molding for attachment to a vehicle including the steps of forming a film with a predetermined radius of curvature and securing the film to the surface of a mold. The steps also include injecting a polymeric material into the mold and forming a base member having an arcuate portion adjacent the arcuate portion of the film and being recessed relative to the top surface of the base member and bonding the film to the base member.

The subject invention provides a method for molding a trim strip in-place with the bright extrusion. This eliminates the additional time and expense required to attach a bright extrusion after the plastic base or strip is formed.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is an elevational view of a molded trim with bright extrusion of the subject invention;

FIG. 2 is a sectional view of the subject invention along lines 2—2 of FIG. 1;

FIG. 3 is an enlarged fragmentary view of the bright extrusion attached to the base of FIG. 2; and FIG. 4 is an enlarged fragmentary view of a flange to secure the bright extrusion to the base of FIG. 3.

DESCRIPTION OF THE PREFERRED EMBODIMENT

A trim molding such as a bumper strip or nerf strip for attachment to a vehicle (not shown) is generally shown at 10 in FIGS. 1 and 2. The trim molding 10 comprises a base member 12 having, preferably, an arcuate portion 14. The portion 14 may have other geometrical configurations. Preferably, the portion 14 is recessed relative to the top surface 16 thereof. The base member 12 is made of a polymeric material.

The trim molding 10 further comprises a bright extrusion or insert film, generally indicated at 18, disposed adjacent about or to the arcuate portion 14. The bright insert 18 comprises a first film 20 having a metallized or bright surface on one side of a plastic film or backing. The film 20 has a predetermined radius of curvature complementary to the arcuate portion 14 and is disposed adjacent the arcuate portion 14. A second film 22 of clear plastic is disposed about or adjacent to the first film 20 to protect the first film 20 from contaminants contacting the first film 20. The base member 12 is molded as one piece about the films 20, 22 to form a one piece base member and to secure films 20, 22 thereto. As illustrated in FIG. 4, the base member 12 may include a flange 24 extending outwardly therefrom and spaced from and substantially parallel to the arcuate portion 14. The flange 24 acts as a bond flap for securing the films 20, 22 between the flange 24 and arcuate portion 14.

Accordingly, the subject invention provides a method of making a trim molding 10 for attachment to a vehicle including the steps of forming the films 20, 22 with a predetermined radius of curvature. Two-sided tape or other suitable holding means is used for securing the films 20, 22 to the surface of a mold for conventional plastic injection molding. These steps further include injecting a polymeric or plastic material into the mold and forming a base member 12 having an arcuate portion 14 which may be recessed relative to top surface 16 thereof if desired and about the first and second films 20, 22 to form a one piece base member 12 and to secure the films 20, 22 thereto. This results in a tight bond being formed along the surface of the arcuate portion 14 and at the end portions of the films 20, 22.

The invention has been described in an illustrative manner, and it is to be understood that the terminology which has been used is intended to be in the nature of words of description rather that of limitation.

Obviously, many modifications and variations of the present invention are possible in light of the above teachings. It is, therefore, to be understood that within the scope of the appended claims, the invention may be practiced otherwise than as specifically described.

What is claimed is:

1. An elongated trim molding for attachment to a vehicle comprising:
    a base member having an outer surface with an arcuate recessed surface portion;
    a first film having a curvature complementary to said arcuate recessed portion, said first film having inner and outer surfaces and edges with said inner surface bonded to said arcuate recessed surface portion of said base member;
    said base member being molded over said edges of said first film.

2. A trim molding as set forth in claim 1 characterized by said base member being made of a polymeric material.

3. A trim molding as set forth in claim 2 further characterized by said first film comprising a metallized surface on plastic film.

4. A trim molding as set forth in claim 3 including a second film bonded to the outer surface of said first film for preventing contaminants from contacting said first film.

5. A trim molding as set forth in claim 4 characterized by said base member having a flange extending over a portion of said second film.

6. A trim molding as set forth in claim 5 wherein said base member has unitary end portions and is a one-piece base member completely covering all lateral and end edges of said first and second films.

7. An elongated trim molding for attachment to a vehicle comprising:
    a base member having an arcuate portion recessed relative to a top surface thereof, said base member being made of a polymeric material;
    a first film disposed adjacent said arcuate portion, said film comprising a metallized surface on plastic film;

a second film disposed adjacent said first film for preventing contaminants from contacting said first film;

said base member having a flange extending outwardly therefrom and spaced and substantially parallel to said arcuate portion;

said base member being molded over all edges of said first and second films to form a one-piece base member and secure said films thereto.

* * * * *